June 30, 1931.  W. SHAKESPEARE, JR  1,812,220
FISHING REEL
Filed Oct. 1, 1928

INVENTOR
William Shakespeare Jr.
BY Chappell Earl
ATTORNEYS

Patented June 30, 1931

1,812,220

UNITED STATES PATENT OFFICE

WILLIAM SHAKESPEARE, JR., OF KALAMAZOO, MICHIGAN, ASSIGNOR TO SHAKESPEARE COMPANY, OF KALAMAZOO, MICHIGAN

FISHING REEL

Application filed October 1, 1928. Serial No. 309,578.

The main objects of this invention are:

First, to provide an improved fishing reel frame which may be very quickly and easily assembled and disassembled.

Second, to provide an improved fishing reel having these advantages which may be assembled and disassembled by an inexperienced person for cleaning or oiling, and when assembled is very strong and is attractive in appearance.

Objects pertaining to details and economies of my invention will definitely appear from the description to follow. The invention is defined in the claims.

A structure which embodies the features of my invention is clearly illustrated in the accompanying drawings, in which.

Figure 1:
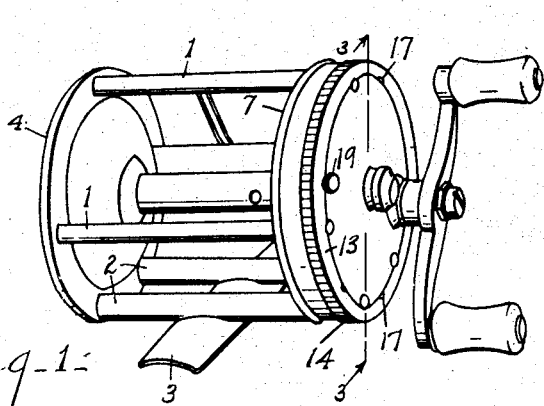
Fig. 1 is a perspective view of a fishing reel embodying the features of my invention.
Figure 6:
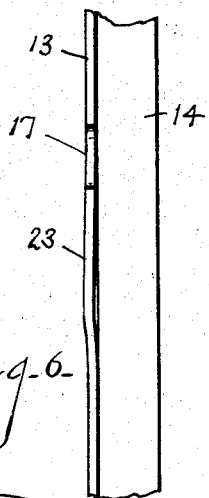
Fig. 6 is a fragmentary view on a line corresponding to line 6—6 of Fig. 5.

In the embodiment illustrated in the accompanying drawings my improved reel frame comprises a plurality of pillars 1, 1 and 2, 2, the pillars 2, 2 being base pillars on which the reel seat 3 is mounted. These pillars are secured to the tail plate 4.

The pillars are shouldered at 5 providing reduced ends 6 adapted to receive the inner head plate 7 and the outer head plate 8 which coact in providing a housing for the gear parts.

Figure 3:
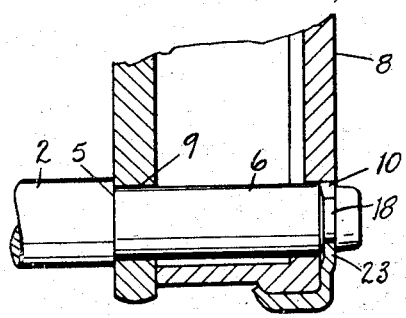
Fig. 3 is an enlarged detail partially in section on line 3—3 of Fig. 1.

The plate 7 is in the form of a flat disk having openings 9 therein to receive the reduced ends of the pillars and is supported by the shoulders thereof as shown by Fig. 3. The outer head plate 8 has openings 10 alined with the openings 9 and is provided with a peripheral flange 11 abutting the outer side of the head plate 7.

The face of the outer head plate is rabbeted at 12 to receive the downwardly projecting flange 13 of the locking ring 14. This locking ring is rotatably mounted upon a peripheral rib 15 on the outer head plate, the inner edge 16 of the ring being spun over the rib to fasten the locking ring. The locking ring has notches 17 in its inwardly projecting flange portion adapted to be alined with the holes in the head plates to receive the pillars.

Figure 2:
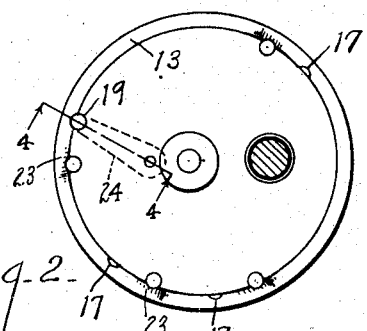
Fig. 2 is an end view thereof, the crank staff being shown in section.
Figure 5:
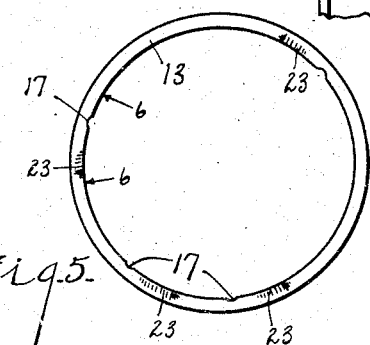
Fig. 5 is an end view of the locking ring.
Figure 4:
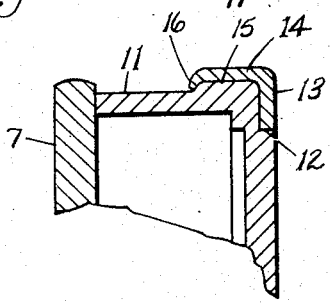
Fig. 4 is an enlarged detail section on line 4—4 of Fig. 2.
Figure 4:
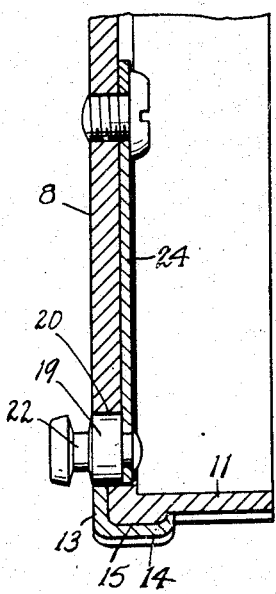

The pillars have recesses 18, preferably annular, so that the locking ring may be engaged therewith by a rotative movement as shown by Figs. 1, 2 and 3, thereby locking the parts in assembled relation.

The locking ring flange is cammed as at 23 adjacent each notch 17 so that as the ring is rotated the parts are secured with a clamping action. This is sufficient to compensate for variations in stock and the tolerance allowed in the manufacture of the parts.

The locking ring is retained in its locking position by this friction and also by means of a detent pin 19 which is mounted on the blade spring 24 within the opening 20 in the outer head plate. The locking pin is spaced so that when the ring is rotated to locking position the pin engages one of the notches 17 therein. The pin has a recess 22 which may be brought into register with the ring to permit rotation of the ring. The locking ring is very securely retained so that it is quite unlikely that the locking ring should be accidentally loosened when the parts are placed under clamping stress, so that there is no rattling or relative movement of the parts.

My improvements enable the rapid assembling and disassembling of the reel; the parts are simple and economical to produce and the structure is attractive in appearance. I have not attempted to illustrate or describe certain other embodiments or adaptations as it is believed that this disclosure will enable those skilled in the art to embody or adapt my improvements as may be desired.

Having thus described my invention what I claim as new and desire to secure by Letters Patent is:

1. In a fishing reel frame, the combination of a tail plate, a plurality of pillars secured at one end to said tail plate and shouldered at their other ends, said pillars being recessed adjacent their ends, a head comprising inner and outer head plates having alined holes therein to receive the shouldered ends of said pillars with the inner head plate abutting the shoulders, the outer head plate being rabbeted and having a peripheral flange engaging the outer side of the inner head plate and provided with a rib, a locking ring rotatably engaged with said rib and having an inwardly projecting flange lying in the said rabbet of said outer head plate and notched to receive said pillars when alined therewith, said locking ring being adapted on rotation from such position to engage said recesses in said pillars, a detent pin mounted on said outer head plate, said locking ring flange being notched to receive said detent pin, said detent pin being recessed to permit the rotation of the ring when the recess is alined with the flange of the locking ring, and a spring to which said detent pin is securely mounted on the inner side of said outer head plate, said spring acting to yieldingly hold said pin in locking position.

2. In a fishing reel frame, the combination of a tail plate, a plurality of pillars secured at one end to said tail plate and shouldered at their other ends, said pillars being recessed adjacent their ends, a head comprising inner and outer head plates having alined holes therein to receive the shouldered ends of said pillars with the inner head plate abutting the shoulders, the outer head plate being rabbeted and having a peripheral flange engaging the outer side of the inner head plate and provided with a rib, and a locking ring rotatably engaged with said rib and having an inwardly projecting flange lying in the said rabbet of said outer head plate and notched to receive said pillars when alined therewith, said locking ring being adapted on rotation from such position to engage said recesses in said pillars.

3. In a fishing reel frame, the combination of a tail plate, a plurality of pillars secured at one end to said tail plate and shouldered at their other ends, said pillars being recessed adjacent their ends, a head comprising inner and outer head plates having alined holes therein to receive the shouldered ends of said pillars with the inner head plate abutting the shoulders, a locking ring rotatable on said outer head plate and notched to receive said pillars when alined therewith, said locking ring being adapted on rotation from such position to engage said recesses in said pillars, and a detent pin mounted on the inner side of said outer head plate to project therethrough into locking engagement with said locking ring and to be disengaged therefrom by an inward movement of the detent.

4. A fishing reel frame comprising a plurality of pillars, a head member movably mounted on said pillars, said head member having a rabbeted face and a peripheral rib, a locking ring rotatably mounted on said rib and having an inwardly projecting flange lying in said rabbet of said head member and notched to receive said pillars when the notches are alined with the pillars, said pillars being notched to receive said flange on the rotation thereof, and a detent mounted on the inner side of said head member to project through said head member into locking engagement with said locking ring and adapted to be disengaged therefrom by an inward movement.

5. A fishing reel frame comprising a plurality of pillars, a head member having holes therein to receive said pillars, a locking ring rotatably mounted on said head member and having notches adapted to be brought into register with the said openings to receive the pillars, and transversely disposed cam portions adjacent said notches to be engaged with said pillars by rotative movement of the ring for clamping the head upon said pillars.

6. A fishing reel frame comprising a plurality of pillars, a head member movably mounted on said pillars, said head member having a rabbeted face and a peripheral rib, and a locking ring rotatably mounted on said rib and having an inwardly projecting flange lying in said rabbet of said head member and notched to receive said pillars when the notches are alined with the pillars, said pillars being notched to receive said flange on the rotation thereof, said flange being transversely cammed to engage said pillars for clamping the head upon said pillars.

7. A fishing reel frame comprising a plurality of pillars, a head member having holes therein to receive said pillars, and a locking ring rotatably mounted on said head member and having notches adapted to be brought into register with the said openings to receive the pillars, said pillars being recessed to receive said locking ring on rotative movement thereof, said locking ring being transversely cammed for frictional engagement with said pillars for clamping the head upon said pillars.

In witness whereof I have hereunto set my hand.

WILLIAM SHAKESPEARE, Jr.